(12) United States Patent
Morris

(10) Patent No.: US 7,305,408 B2
(45) Date of Patent: Dec. 4, 2007

(54) SYSTEM AND METHOD FOR CROSS ATTRIBUTE ANALYSIS AND MANIPULATION IN ONLINE ANALYTICAL PROCESSING (OLAP) AND MULTI-DIMENSIONAL PLANNING APPLICATIONS BY DIMENSION SPLITTING

(75) Inventor: Richard Adrian Morris, Harrogate (GB)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 10/639,551

(22) Filed: Aug. 12, 2003

(65) Prior Publication Data
US 2005/0038768 A1   Feb. 17, 2005

(51) Int. Cl.
*G06F 17/00* (2006.01)
(52) U.S. Cl. ........................ 707/102; 707/101
(58) Field of Classification Search ..... 707/100–104.1, 707/3–10
See application file for complete search history.

(56) References Cited

U.S. PATENT DOCUMENTS 6,658,413 B1 *  12/2003  Reddy et al. .................. 707/8

2002/0087633 A1 *  7/2002  Nelson ........................ 709/204

* cited by examiner

*Primary Examiner*—Joon Hwan Hwang (57) ABSTRACT

A system for cross attribute analysis for sales data in a multi-dimensional planning system. The system includes a set of processing modules that performs cross attribute analysis and manipulation in online analytical processing (OLAP) and multi-dimensional planning applications by dimension splitting. A number of processing module are utilized to perform the required processing. The system includes a hierarchy processing module for aggregating data up a hierarchical data structure, a dimension splitting module for creating pseudo-hierarchical data structures from data within the hierarchical data structure, and a multi-dimensional data viewing module for displaying a set of multi-dimensional data set according to the hierarchical data structure in a multi-dimensional spreadsheet. A single dimension corresponds to an attribute of the data contained within the hierarchical data structure.

11 Claims, 10 Drawing Sheets

| Location 1 | | Week 1 | Week 2 | Week 3 | Week 4 | Month |
|---|---|---|---|---|---|---|
| Item 1 | Sales | xxx | xxx | xxx | xxx | xxx |
|  | Stock | xxx | xxx | xxx | xxx | xxx |
| Item 2 | Sales | xxx | xxx | xxx | xxx | xxx |
|  | Stock | xxx | xxx | xxx | xxx | xxx |
| Item 3 | Sales | xxx | xxx | xxx | xxx | xxx |
|  | Stock | xxx | xxx | xxx | xxx | xxx |

Fig. 3b

| Location 1 | Item 1 | | Item 2 | | Item 3 | |
|---|---|---|---|---|---|---|
|  | Sales | Stock | Sales | Stock | Sales | Stock |

| Location 1<br>Class 1<br>Season 1 | Sales | | | Stock | | |
|---|---|---|---|---|---|---|
| | US | Canada | Asia | US | Canada | Asia |
| Low PP | xxx | xxx | xxx | xxx | xxx | xxx |
| Medium PP | xxx | xxx | xxx | xxx | xxx | xxx |
| High PP | xxx | xxx | xxx | xxx | xxx | xxx |
| TOTAL | xxx | xxx | xxx | xxx | xxx | xxx |

Fig. 7 ← 701

| Location 1<br>Sales Class 1 | | | Week 1 | Week 2 | Week 3 | Week 4 | Month |
|---|---|---|---|---|---|---|---|
| Low PP | Canada | Item 1 | xxx | xxx | xxx | xxx | xxx |
| | | Item 4 | xxx | xxx | xxx | xxx | xxx |
| | | Total | xxx | xxx | xxx | xxx | xxx |
| | Asia | Item 3 | xxx | xxx | xxx | xxx | xxx |
| | | Total | xxx | xxx | xxx | xxx | xxx |
| | Total | Total | xxx | xxx | xxx | xxx | xxx |
| Med PP | USA | Item 5 | xxx | xxx | xxx | xxx | xxx |
| | | Item 6 | xxx | xxx | xxx | xxx | xxx |
| | | Item 8 | xxx | xxx | xxx | xxx | xxx |
| | | Total | xxx | xxx | xxx | xxx | xxx |
| | Canada | Item 2 | xxx | xxx | xxx | xxx | xxx |
| | | Total | xxx | xxx | xxx | xxx | xxx |
| | Asia | Item 7 | xxx | xxx | xxx | xxx | xxx |
| | | Item 9 | xxx | xxx | xxx | xxx | xxx |
| | | Total | xxx | xxx | xxx | xxx | xxx |
| | Total | Total | xxx | xxx | xxx | xxx | xxx |

SYSTEM AND METHOD FOR CROSS ATTRIBUTE ANALYSIS AND MANIPULATION IN ONLINE ANALYTICAL PROCESSING (OLAP) AND MULTI-DIMENSIONAL PLANNING APPLICATIONS BY DIMENSION SPLITTING

TECHNICAL FIELD

This application relates in general to a method, apparatus, and article of manufacture for cross attribute analysis for multi-dimensional data in a multi-dimensional planning system, and more particularly to a method, apparatus, and article of cross attribute analysis and manipulation in online analytical processing (OLAP) and multi-dimensional planning applications by dimension splitting.

BACKGROUND

For many years, reporting and analysis applications based on a relational data model have had the capability to produce somewhat ad-hoc 'attribute' based totals by summarizing data based on the values of 'attributes'. In this scenario, 'attributes' are one-dimensional facts about a particular member or position, such as the supplier of an item, the region a location belongs to, and similar facts, that can be joined with the facts being reported and 'analyzed' by various forms of sub-totaling. These 'attributes' are often positioned as being 'dimensions' even though such 'dimensions' do not represent the same thing as a dimension in a multi-dimensional model.

OLAP (Online Analytical Processing) and multi-dimensional planning applications (MDP) have traditionally taken a different approach. MDP applications, that are used for Merchandise Planning, for example, are those applications that are OLAP-type applications but with powerful facilities for a user to change data values, and have the application automatically recalculate all other related values. In these types of applications, members are related together into dimensions. In the example for merchandise planning systems, a member is an individual product, or individual locations represented in a dimension. A dimension here represents all different types of related members, for example all types of locations. In a dimension, similar types of members are grouped into levels, where levels may represent entities such as stores, regions, areas, and other groupings of entities for the example merchandise planning systems. Levels are related together through parent-child relationships that are used to build hierarchies. Thus, for example, stores may be the children of districts, which may be the children of regions, which may be the children of areas. This hierarchy can be represented schematically by the diagram 101 shown in FIG. 1a.

Figure 1A:
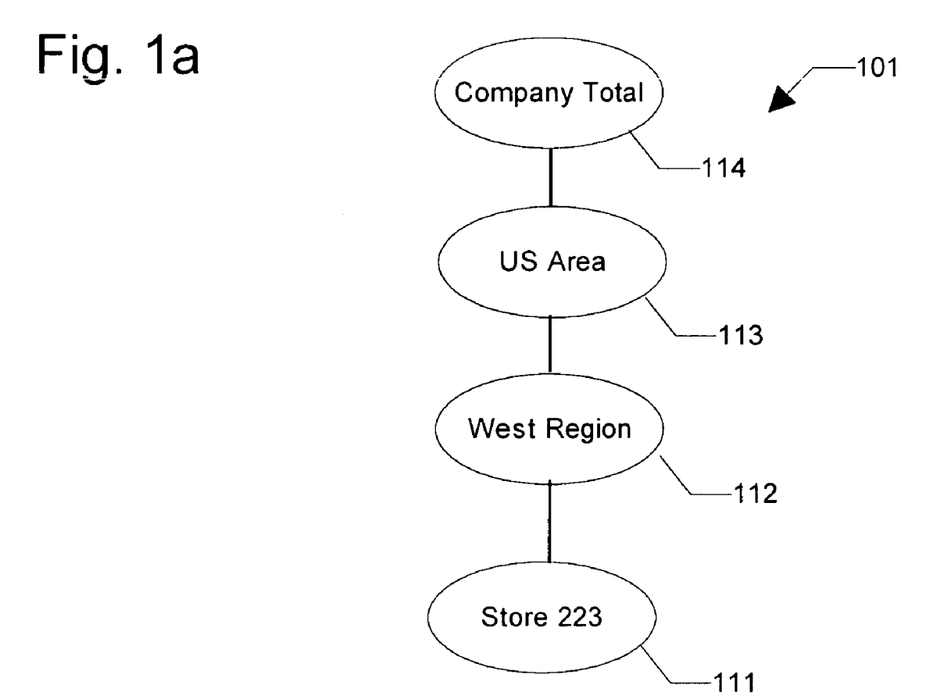
FIGS. 1a and 1b illustrates an exemplary hierarchical organization for a retail sales organization used with an analysis processing system according to one possible embodiment in which the invention operates.

In FIG. 1a, the hierarchy 101 starts with a value for a "store 223" 111. The total sales for this store 111 is included within a total for the west region 112, and then the US area 113, and finally for the total for the entire company 114. Of course, the totals for the various levels in the hierarchy include values for other stores, areas, and regions within the various totals.

In OLAP and MDP applications, the hierarchies define the consolidation, or aggregation. paths for producing roll-ups, which occur automatically once the hierarchy is defined. These hierarchies are typically predefined through some administrative process or interface, and may be referred to as formal hierarchies to distinguish them from attribute hierarchies. OLAP and MDP applications typically support multiple hierarchies in a single dimension. These multiple hierarchies are usually referred to as alternate hierarchies. Thus if the example location hierarchy, shown in FIG. 1a, represents an operational location hierarchy in a retail organization, the same stores may also be analyzed by their fascia in an alternate hierarchy 102 is illustrated within FIG. 1b. In this alternate hierarchy 102, the store value 121 as shown at the bottom of the hierarchy 102. An intermediate value 122 is shown for the fascia and the total for the company 123 is at the top of the hierarchy 102. Any number of such hierarchies are possible.

Figure 1B:
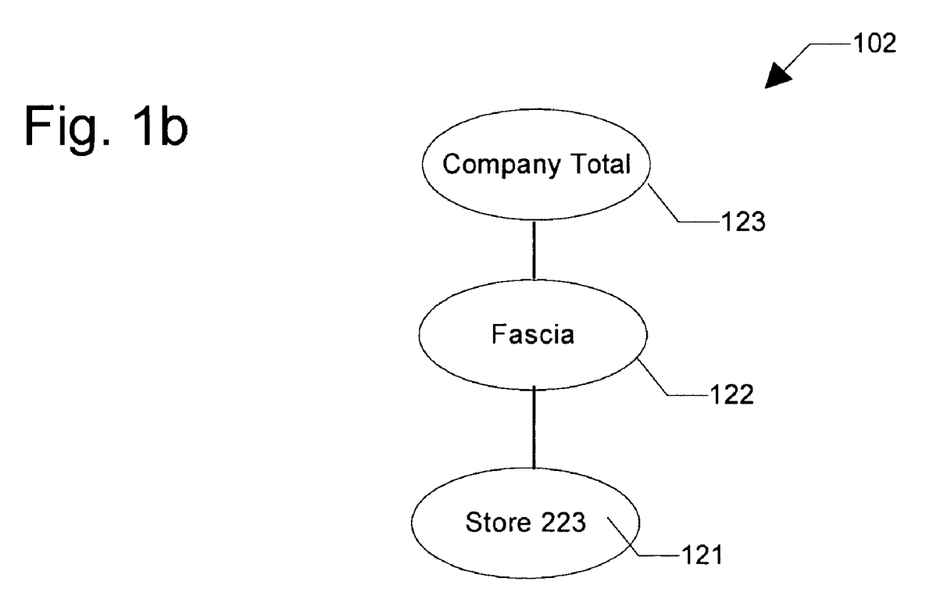

It could be argued that the fascia 122 of a store 121 is an attribute, and for some OLAP and MDP applications such attribute hierarchies may be built dynamically when required by the user from the values of attributes. In those applications, the decision as to whether any particular relationship should be modeled as a formal hierarchy or attribute hierarchy is one of ease of use, ease of definition, and performance tuning for the application.

Figure 2:
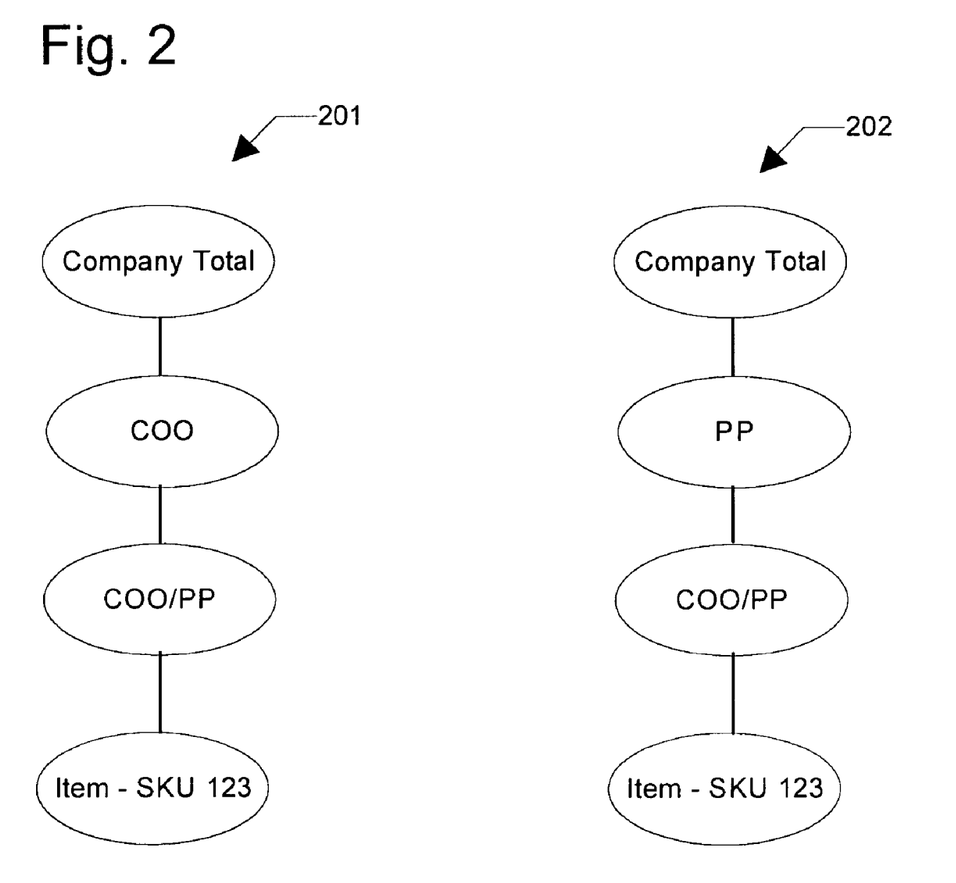
FIG. 2 illustrates alternative exemplary hierarchical organization for a retail sales organization used with an analysis processing system according to one possible embodiment in which the invention operates.

However, this approach to building dynamic attribute hierarchies by OLAP and MDP applications does not provide for any type of cross attribute analysis. If the attributes have fairly static values, and there is a very small number of such values, formal alternate hierarchies may be built that allow some limited form of cross attribute analysis. For example, if two attributes of an item are a price point (PP) and a country of origin (COO), the alternate hierarchies could be built as shown in FIG. 2.

These alternate hierarchies 201–202 provide for members that represent individual price points (such as high, medium, and low) and countries of origin. It also allows limited cross attribute analysis as there are members that represent combinations of these attributes, such as USA/high pp, USA/medium pp, Canada/medium pp, and any other combination of attributes. However, this formal alternate hierarchies approach cannot be used with more dynamic attributes and becomes an administrative and end-user nightmare when there are more than a small number of attributes, as a very large number of formal alternate hierarchies would need to be maintained and used. The present invention as described herein as a system and method for providing cross attribute analysis and manipulation in Online Analytical Processing (OLAP) and multi-dimensional planning applications by dimension splitting provides for a solution to this problem.

SUMMARY

The present invention relates in general to a method, apparatus, and article of cross attribute analysis and manipulation in online analytical processing (OLAP) and multi-dimensional planning applications by dimension splitting. One aspect of the present invention is a system for providing cross attribute analysis and manipulation in online analytical processing and multi-dimensional planning applications by dimension splitting. The system has a hierarchy processing module for aggregating data up a hierarchical data structure, a dimension splitting module for creating pseudo-hierarchical data structures from data within the hierarchical data structure, and a multi-dimensional data viewing module for displaying a set of multi-dimensional data according to the hierarchical data structure in a multi-dimensional spreadsheet. A single dimension corresponds to an attribute of the data contained within the hierarchical data structure.

Another aspect of the present invention is a method, and corresponding computer data product used to implement a method for providing cross attribute analysis and manipulation in online analytical processing and multi-dimensional planning applications by dimension splitting. The method generates a hierarchical organization having a plurality of dimensions of members, a dimension being all possible different types of related members and a member having attributes; defines a set of levels for the plurality of dimension of members, a level being a grouping of similar members and being organizing into hierarchical parent-child relationships and the set of levels being defined by a set of activated members; determines attribute values for each level in the hierarchical organization by sub-totaling the attribute values up the hierarchical organization; and presents a visual display for the attribute values for each level in the hierarchical organization in a two-dimensional tabular format.

DETAILED DESCRIPTION

The present invention relates to method, apparatus, and article of cross attribute analysis and manipulation in online analytical processing (OLAP) and multi-dimensional planning applications by dimension splitting. In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

FIGS. 1a and 1b illustrates an exemplary hierarchical organizations for a retail sales organization used with an analysis processing system according to one possible embodiment in which the invention operates. These hierarchies, as discussed above with reference to FIGS. 1a and 1b, are used to define the sales analysis and manipulation processing that is present in a system according to the present invention. FIG. 2 illustrates alternative exemplary hierarchical organization for a retail sales organization used with an analysis processing system according to one possible embodiment in which the invention operates. These figures illustrate hierarchies used throughout the instant description.

In the examples shown in FIGS. 1 and 2, attributes are shown that are fairly static for a given member, such as the fascia of a store, or the country of origin or price point of an item. State-of-the-art planning and analysis systems also need attribute values that are dynamic, that are based upon various forms of status information, or that may possess multiple values for a member, and the value that is needed may be determined from the context of the request. Any of these, or similar, types of attribute may be deployed and used with dimension splitting.

Dynamic attribute values can be thought to be those attribute values that are based on multi-dimensional data. If members of all the other active dimensions are fully specified in the definition of the attribute, then there is just a single value for each member, so it can be treated as an attribute. An example of this type of attribute might be planned unit sales across the whole company for the season spring 2003, which can be considered to be an attribute of each product. Attributes that are based on the status of a member can employ any type of status information supported by the application, for example whether a checkpoint in the planning methodology, such as a pre-season plan having been approved by a manager, has been reached, or whether the member has particular alerts or exceptions.

Context sensitive attributes are an extension of the dynamic attributes discussed above, but where the members in all the other dimensions are not fully specified. Thus, for example, there may be a piece of multi-dimensional that captures the fashionability of customers. This may be assumed to vary by product classification and by store. For example, an Atlanta store may be fashion forward for dresses, but fashion following for coats. Once the context of a dresses class has been established, this information resolves into a single value for each store, and thus may be used as if it were an attribute.

Note that for effective use in dimension splitting, some attributes may go through a banding process, to group together similar values into bands for analysis. Without this banding process, many numeric or date based attributes are effectively useless, as most members would have different values. Thus, for example, the planned unit sales across the whole company for the season spring 2003 might be put into bands of 0–2,000 units, 2,000–5,000 units, or 5,000–10,000 units as one example.

Most OLAP systems do not allow the user to manipulate the values of cells at all or only allow such manipulation for detail members. Detail members are the members located at the 'bottom' of the hierarchies. MDP applications, on the other hand, allow the user to manipulate changes to cells at any level, and the integrity and mutual consistency of the data is guaranteed by a calculation process that includes steps such as the spreading of high-level changes down the hierarchies, applying formulae, or rules, to recalculate related measures for detail members and then consolidating the results of all changed measures. Read only cross attribute analyses, whilst of some benefit, would fall well short of the functionality desired by many users of MDP applications. Since MDP applications spread changes at higher levels, dimension splitting must also support some form of spreading processes to be a viable technique for MDP applications.

For most MDP applications, the spreading processes operate down a single hierarchy at a time. While it is possible to solve simultaneous equations to resolve related changes in multiple alternate hierarchies, this approach has typically been deemed to be an unnecessary complication to a system's operation. Therefore, most MDP applications allow members in just a single hierarchy to be manipulated at any given time. Some MDP applications make the user predetermine this active hierarchy, and use a process normally referred to as protection processing to protect cells, or at least temporarily make the cells non-manipulable, for any members that are not in that hierarchy. More sophisticated MDP applications have no predetermination, and only protect members at those levels that cannot possibly lie in a single hierarchy with all the levels where there have already been changes made. This effectively leaves open the actual 'active hierarchy' to use, though the choice gets more restricted, and may become forced, as changes are made at further levels. Thus for dimension splitting to be a viable technique for MDP applications, a system must also support some form of hierarchical protection processing.

Most OLAP and MDP applications have a variety of ways in which data may be viewed and analyzed. Since all such applications are inherently multi-dimensional, the viewing methods all deliberately exploit the multi-dimensional nature of the data. The most usual form of viewing multi-dimensional data is in some form of spreadsheet view. Since spreadsheets are physically two dimensional, some form of representation has to be found for showing the several dimensions being modeled in just two physical dimensions.

Figure 3A:
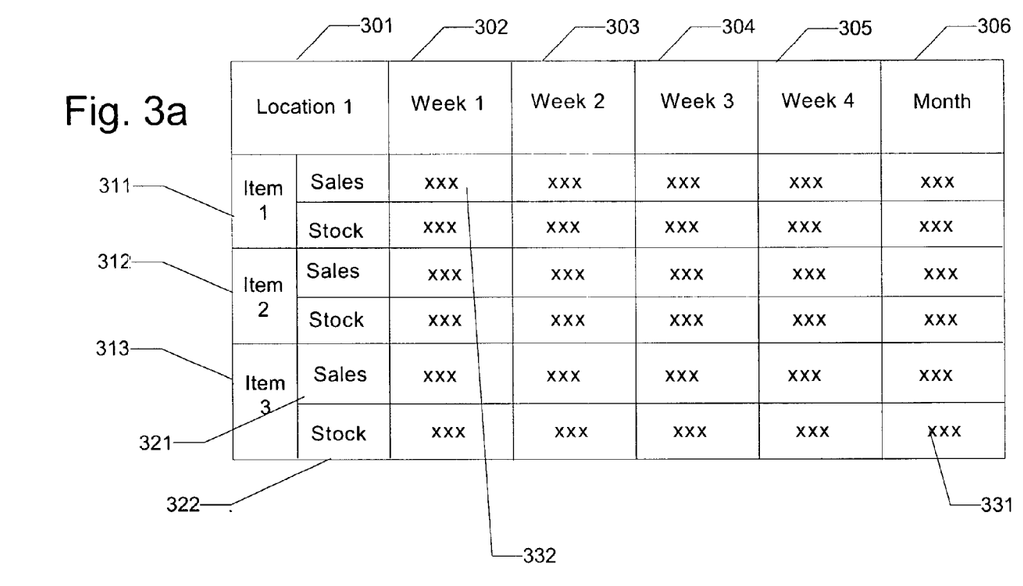
FIG. 3 illustrates an exemplary spreadsheet containing a two dimensional representation of sales and stock data according to an example embodiment of the present invention.

FIG. 3a is a simple example of a multi-dimensional spreadsheet showing a typical representation of a four dimensional model. The exact representation of nested dimensions (i.e. more than one dimension in any orientation) and the page area varies from application to application, as does the representation used to show a hierarchical relationship between members at different levels in the same hierarchy. Here the dimensions can be identified as a location dimension 301, a product dimension 311–313, a time dimension 302–306, and a measures dimension 321–322.

Dimensions are laid out in a multi-dimensional spreadsheet in one of three orientations: across the view, down the view, and in the page area. In the example in FIG. 3a, the location dimension is in the page area 301. Dimensions in the page area have just a single active member, in this case location 1 and all the data cells 331 that are visible are for that member. Most OLAP and MDP applications have a variety of ways in which the page member can be quickly and easily changed, including VCR-like controls, drilling up and down, and finding a member by relational-like query. A spreadsheet can thus be considered to be a single logical page of a report that has a page for each combination of page dimension members. The full multi-dimensional address for a cell can be found from the members shown in all the row and column headers for the cell, plus all the page members. Thus, for example, the top left cell 332 in FIG. 3a, is for sales for item 1 311 in location 1 301 for week 1 302.

Dimensions in the across area 302–306 have their members positioned as column headers. In FIG. 3a the time dimension is across, with members from two different levels shown for week data 302–305 and month data 306. Dimensions in the down area 311–313 and 321–322 have their members positioned as row headers. In FIG. 3a, both the product or items 311–313 dimension and the measures, both sales 321 and stock 322 dimension are down.

Most OLAP and MDP applications have very flexible processes for laying out spreadsheet views, and determining the orientation of dimensions within those views, with 'slice-and-dice' process usually being used to change the orientation of dimensions in the views. Most applications support more than one dimension in any area: the example in FIG. 3a shows two dimensions in the down area. A representation of two dimensions in the across area, might look like the dimensions 340 shown in FIG. 3b.

Figure 3B:
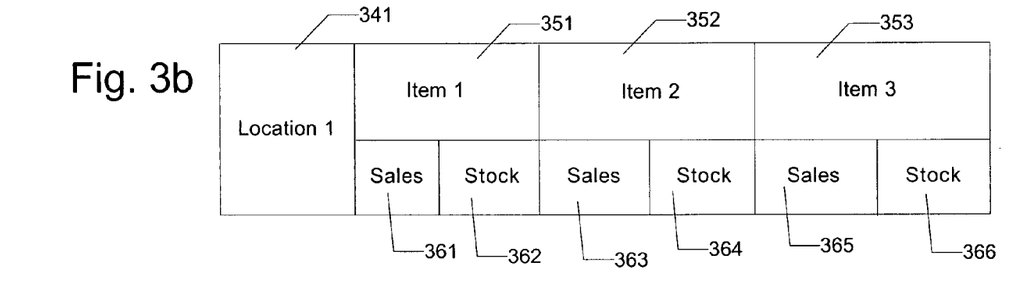

FIG. 3b shows the same data in column form that was shown in FIG. 3a in row form. The location 1 data 341 is represented by the contents of the table. Column data for item dimension data 351–353 is shown in the top column heading with sales and stock data 361–366 shown in alternate columns underneath each item. Similarly, the time dimension may be represented in the rows of a complete spreadsheet table.

Most OLAP and MDP applications allow multiple views to be active at any time, and usually those views may use different alternate hierarchies in a dimension. For the purpose of view layout, dimension splitting acts much like alternate hierarchies, thus one view may have a normal alternate hierarchy, and another may have dimensions that have resulted through dimension splitting. Discussions, below, about the effect on dimensions of dimension splitting will therefore normally apply just to the view(s) that are using the split dimensions, although the discussion, above, of the active hierarchy used for spreading, and thus protection processing applies across all views.

Figure 4:
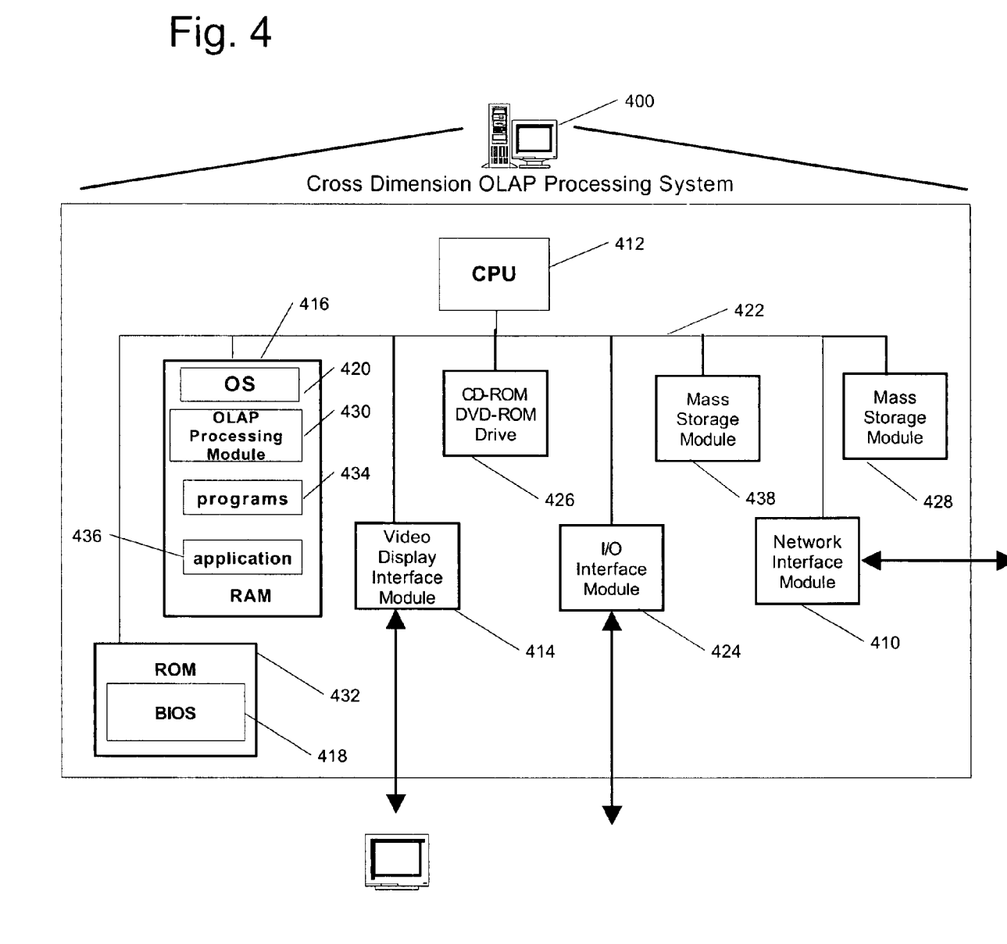
FIG. 4 illustrates a computing system that may be used to construct various computing systems that may be part of a retail sales analysis processing system according to one embodiment of the present invention.

FIG. 4 illustrates a computing system that may be used to construct various computing systems that may be part of a retail sales planning and analysis processing system according to one embodiment of the present invention. In an exemplary embodiment of a cross dimension OLAP processing system, computing system 400 is operative to provide a multimedia display data package creation and editing system.

Those of ordinary skill in the art will appreciate that the processing system 400 may include many more components than those shown with reference to a computing system 400 shown in FIG. 4. However, the components shown are sufficient to disclose an illustrative embodiment for practicing the present invention. As shown in FIG. 4, the processing system 400 is connected to WAN/LAN 100, or other communications network, via network interface unit 410. Those of ordinary skill in the art will appreciate that network interface unit 410 includes the necessary circuitry for connecting processing system 400 to WAN/LAN 100, and is constructed for use with various communication protocols including the TCP/IP protocol. Typically, network interface unit 410 is a card contained within the processing system 400.

The processing system 400 also includes processing unit 412, video display adapter 414, and a mass memory 416, all connected via bus 422. The mass memory generally includes RAM 416, ROM 432, and one or more permanent mass storage devices, such as hard disk drive 428, a tape drive, CD-ROM/DVD-ROM drive 426, and/or a floppy disk drive. The mass memory stores operating system 420 for controlling the operation of processing system 400. It will be appreciated that this component may comprise a general purpose server operating system as is known to those of ordinary skill in the art, such as UNIX, MAC OS™, LINUX™, or Microsoft WINDOWS NT®. Basic input/output system ("BIOS") 418 is also provided for controlling the low-level operation of processing system 400.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing multimedia display data packages. More specifically, the mass memory stores applications including cross attribute OLAP analysis and manipulation application program 430, utility programs 434, and related programs. The cross attribute OLAP analysis and manipulation application program 430 includes computer executable instructions which, when executed by computer 400, generate user displays, including performing the logic described above.

The processing system 400 also comprises input/output interface 424 for communicating with external devices, such as a mouse, keyboard, scanner, or other input devices. Likewise, processing system 400 may further comprise additional mass storage facilities such as CD-ROM/DVD-ROM drive 426 and hard disk drive 428. Hard disk drive 428 is utilized by processing system 400 to store, among other things, application programs, databases, and program data used by cross attribute OLAP analysis and manipulation application program 430. For example, customer databases, product databases, image databases, and relational databases may be stored. The operation and implementation of these databases is well known to those skilled in the art.

Dimension splitting is a technique that can be used in OLAP and MDP applications to enable cross attribute analysis and manipulation. In essence it involves taking the members of a single level of a dimension, and creating one or more attribute dimensions based on the values of attributes (of several potential types: see above) that are valid for members of that level. The original dimension does not disappear, but whilst the dimension split is active it changes form such that when cross attribute analysis is active, only levels higher than (i.e. parents, grandparents, etc.) the split level may be viewed. In essence, the split level and any lower levels (children, grandchildren, etc.) have been subsumed into the new attribute dimensions that appear as part of the dimension splitting process.

Note that a dimension may not be split at a level if that level is currently protected by protection processing. Once a dimension has been split in this manner, it, as well as the attribute dimension(s) produced as part of the dimension splitting process, are treated as normal dimensions for the purposes of laying out views of the multidimensional data, such as spreadsheet views. Since they are treated as normal dimensions, they may be positioned in any orientation, which means that the dimension that was originally split can now have components positioned in more than one of the three orientations of page, across and down facilitating cross attribute analysis.

Figure 5:
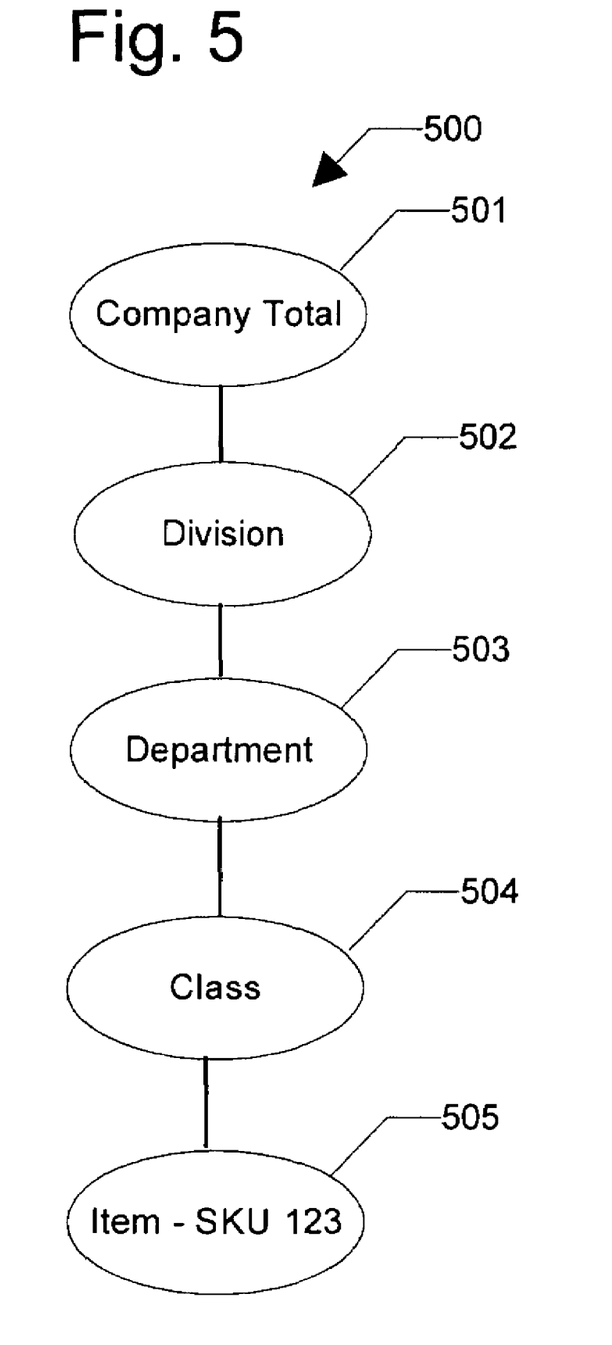
FIG. 5 illustrates another example hierarchy used in combination with FIG. 6 according to yet another example embodiment of the present invention.

An example will make this clearer. Consider the four dimensional (product, location, time, and measures) model used as the basis of FIG. 3a. Let us suppose that there are attributes at the item level in the product dimension that describe the price point (PP) and a country of origin (COO), of an item. For simplicity of examples (and not through any limitation of the inventions), let us further suppose that there exists just a single hierarchy in the product dimension as illustrated in FIG. 5. The hierarchy 500 contains Company total 501, division 502, department 503, class 504, and individual item 505. Let the product dimension be split at the level item, on the attributes price point and country of origin. While the split of the product dimension is active, the model effectively has 6 dimensions: product, location, time, measure, price point and country of origin. This would allow a multi-dimensional spreadsheet view with orientation as shown in FIG. 6.

Figure 6:
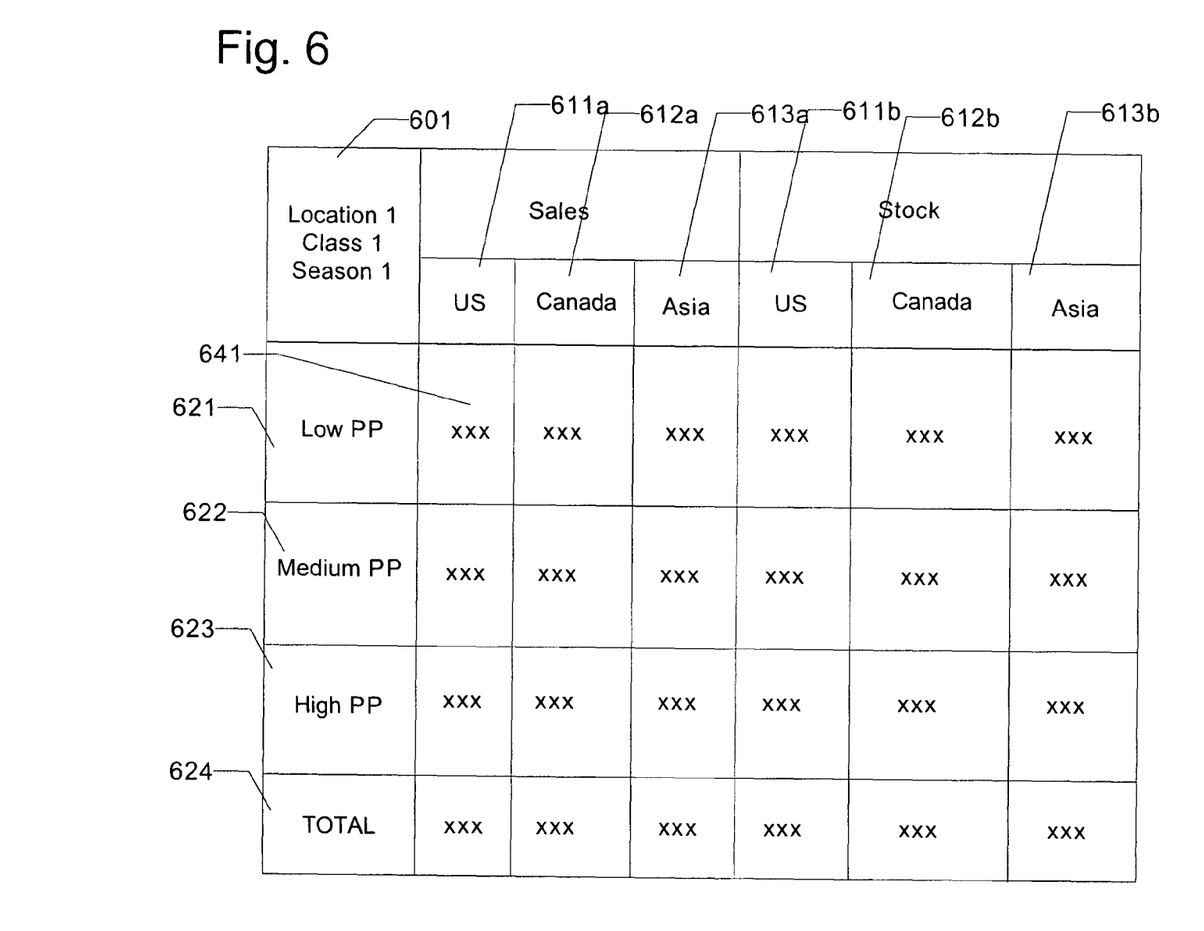
FIG. 6 illustrates a portion of a multi-dimensional spreadsheet representing sales and stock data in a retail sales environment according to an example embodiment of the present invention.

FIG. 6 illustrates a section of a multi-dimensional spreadsheet representing sales and stock data in a retail sales environment according to an example embodiment of the present invention. Note that the three components of the original product dimension (the price point, the country of origin and the truncated product dimension) are all in different orientations: the country of origin dimension is across (with the measures dimension) 611–613, the price point dimension is down 621–624 and the product dimension is in the page area (with the location and time dimensions) 601. The member shown for the product dimension is a Class: as we may see from the hierarchy in FIG. 5, class is the immediate parent of item, the level that was split. We may view any member at Class, Department, Division or Total levels, but with this view orientation, Class is now the lowest level available in the product dimension.

Note that we may no longer assume that a cell in this spreadsheet corresponds to a single cell in the multi-dimensional model. Take, for example, the top leftmost cell 641. We can identify the measure as sales, the location as Location 1 and the time period as Season 1. However there is no such clarity for the product. Since the product dimension has been split, we can identify three components of the definition of the product: Class 1 601, Low PP 621 and USA 611a. In this case, the products represented in the cell are all those products at the split level (i.e. item) that belong to Class 1 601, and have the attribute values Low PP (price point) 621 and USA (COO) 611a. There may be just a single product that fits that combination (in which case the value in the cell is the same as the value for that product), but it is more likely that there are several products that fit that combination (in which case the value in the cell is the appropriate aggregation of the values of the measure for all the products), and it is possible that there may be no products that fit that combination: it may be an invalid combination. Invalid combinations will be highlighted in the user interface will show a default value and will not be manipulable.

Only the dimension that contains the level that is split in a dimension splitting exercise is affected by that exercise. All other dimensions remain unchanged. Note, however, that there may be more than one dimension splitting exercise active at a time, through more than one original dimension being split. In one possible embodiment of dimension splitting, an individual dimension may only be split once at a single level. This process does not preclude the same dimension from being split more than once at different levels in other embodiments. While a dimension splitting exercise is active, the level that was split will normally become inactive, and members at that level may no longer be viewed. Also, any levels that are lower than the split level, i.e. levels that are descended from that level in any hierarchy, are also inactive.

Any alternate hierarchy that did not include the split level is unavailable while the dimension split is active. This process further implies that any level that only appears in hierarchies that do not contain the split-level will be unavailable. Those alternate hierarchies that did include the split-level are all available, but the bottom level available in those hierarchies is the level that is the parent of the split level.

Figure 7:
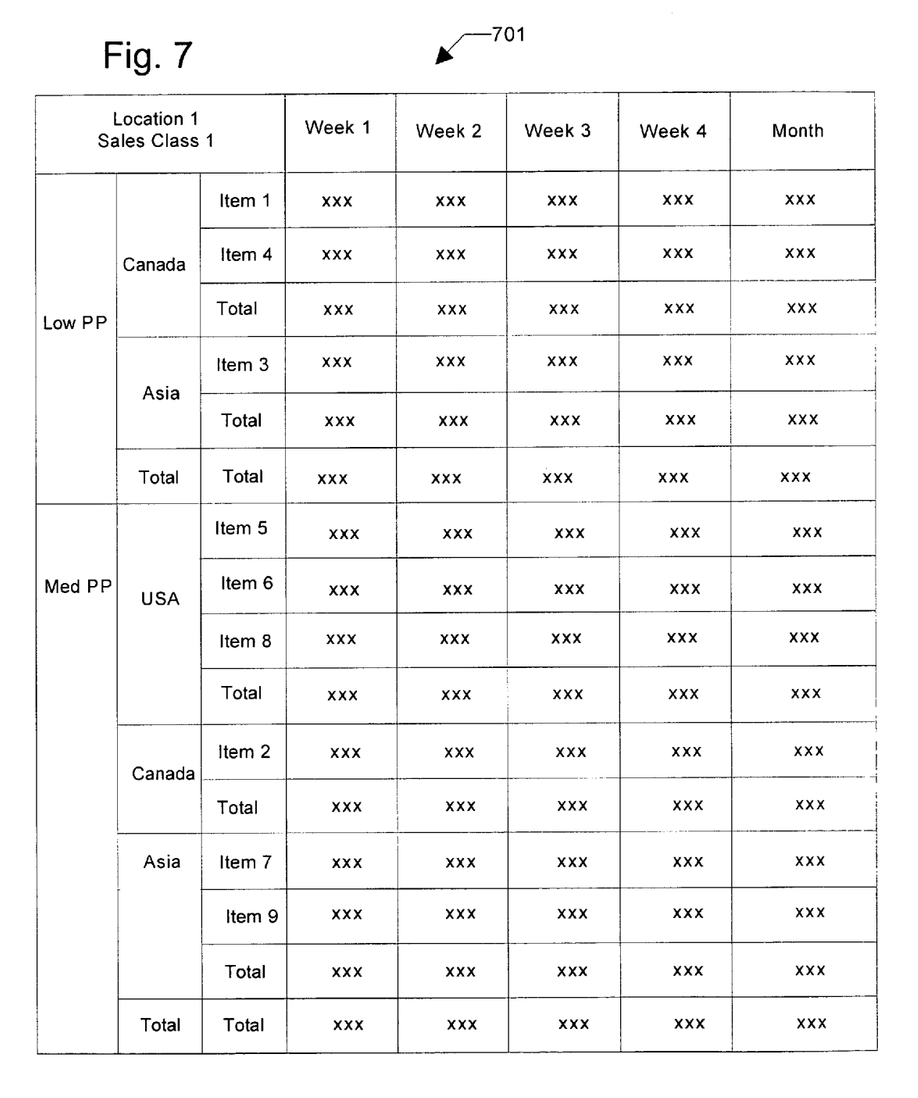
FIG. 7 illustrates a complete multi-dimensional spreadsheet representing sales data in a retail sales environment according to an example embodiment of the present invention.

Members at the split level and below are normally inactive, since there is no simple way that they may be displayed in a spreadsheet view where components of the original dimension are shown in different orientations, for example, some across and some down dimensions, for this purpose dimensions in the page area, may be considered to be the outermost dimensions across or down, as is required to provide cross attribute analysis. However, where the orientation is such that one or more of the components of the split dimension are down and all the other components are in the page area, or one or more of the components of the original dimension are across and all the other components are in the page area, the underlying items at the split level may be shown in an unambiguous manner. In fact, FIG. 7 illustrates a portion of a multi-dimensional spreadsheet 701 representing sales data in a retail sales environment according to an example embodiment of the present invention where all the components are down or in the page area. Note that this representation is optional, and should be explicitly selected or deselected by the user.

In the examples given above, the generated dimensions are effectively dimensions with a single level; the single level being an attribute. Typically, in addition to the values for individual attribute values, totals are required. Also, there will typically be a single generated unknown member in the attribute dimension. This result will be for members whose attribute value is unassigned or indeterminate. Providing this unknown member will ensure that all members at the level split have a parent in the attribute dimension, and that the totals therefore include all split level members and are correct.

The dimension splitting process will allow the totals to be produced in one of two ways: either as an extra total member in the same level as the other attribute values, or as a member in a higher level that is the parent of all the members that represent attribute values. This process, then, will generate a very simple hierarchy.

Figure 8:
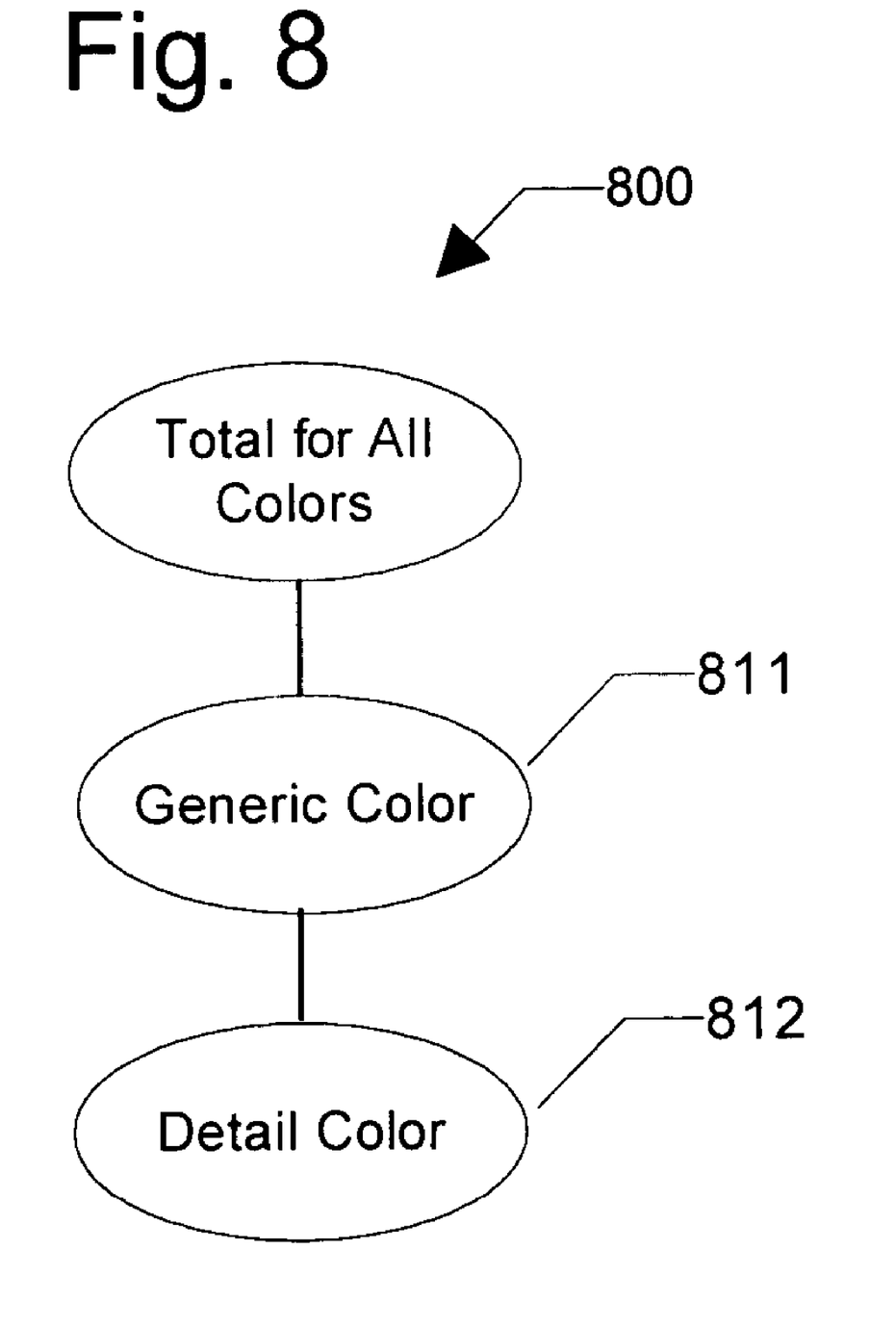
FIG. 8 illustrates another example generated hierarchy according to another example embodiment of the present invention.

FIG. 8 illustrates another example generated hierarchy according to another example embodiment of the present invention. If the attribute values are inherently hierarchical, or can be expressed in a hierarchical manner, the dimension splitting process will allow a hierarchy to be built for the generated dimension. An example of a potential hierarchical attribute is the color of an item 800. A fashion retailer might analyze detail colors 811, such as shades of red: ruby, cerise, or scarlet, and generic colors 812, such as red or blue, and build a hierarchy from the attribute values as shown in FIG. 8.

Figure 9:
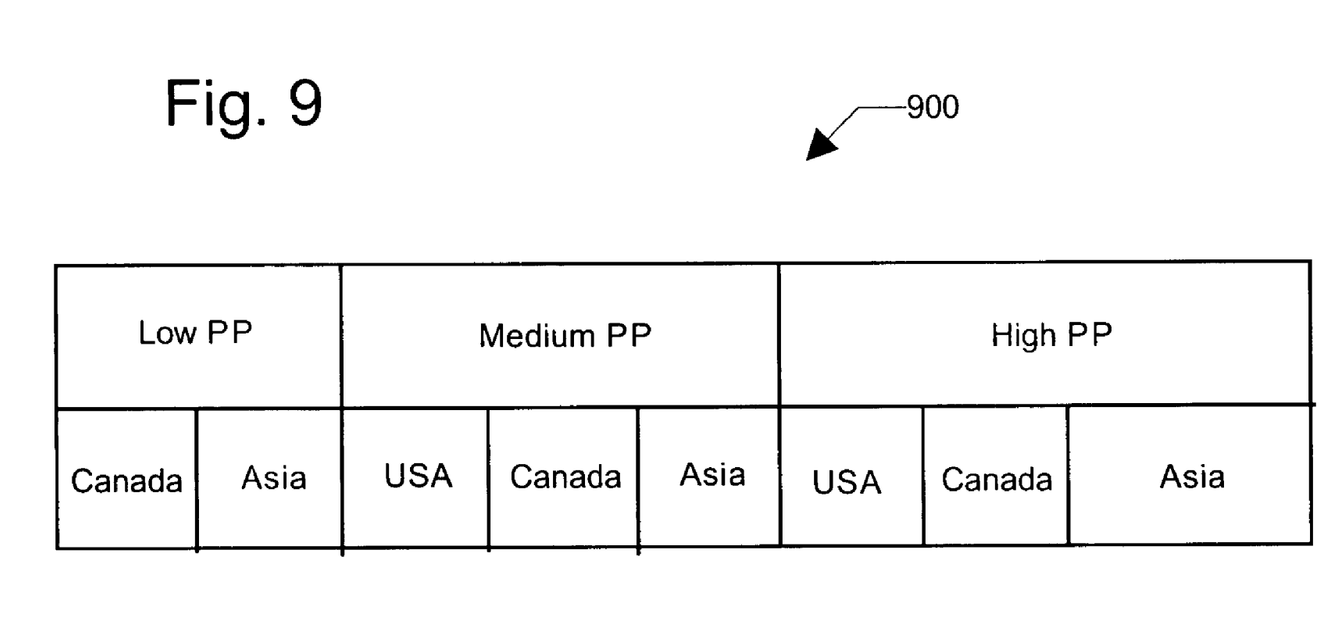
FIG. 9 illustrates an exemplary spreadsheet containing a invalid combinations of a multi-dimensional representation of sales data according to an example embodiment of the present invention.

FIG. 9 illustrates headers from an exemplary spreadsheet containing invalid combinations of a multi-dimensional representation of sales data according to an example embodiment of the present invention. As described above, after dimension splitting, some cells in a multi-dimensional view such as a spreadsheet may logically exist, but not map to any members in the level that was split. In the example above as referenced in FIG. 6, there may be several items in Class 1 that have a value of Low PP for the price point attribute, and several items in Class 1 that have a value of USA for the Country of Origin attribute, but not items in Class 1 that have both those values. Any cell for Class 1, Low PP and USA for any members in the other dimensions represents an Invalid Combination.

Since there is no combination of underlying members that maps to an Invalid Combination cell, such cells will be protected by the User Interface, to prevent the user from changing data values. More sophisticated user interfaces may be able to hide cells that correspond to invalid combinations. The dimension splitting process will offer this option to the user. For example, if, as shown in FIG. 9, there are no items with attribute values of Low PP for the price point attribute, and USA for the Country or Origin, but all other combinations exist, the column headers when both Price Point and Country of Origin dimensions are across, would be represented by the table shown in FIG. 9.

For the user to be able to manipulate cell values from a cross attribute analysis when a dimension splitting exercise is active, the MDP application must be able to spread changes. This process occurs because by definition, the level of the cells changed cannot be at the bottom of a hierarchy. Normally, these types of application use a formal hierarchy to spread changes downward. However, when dimension splitting is active, there is no formal hierarchy to spread down in the dimension that has been split. As a result, a somewhat different, though related, technique must be used.

Even though formal hierarchies do not exist, an application may deduce pseudo-levels that would have been present in pseudo-hierarchies in the split dimension, and the relationships between those pseudo-levels, and so can therefore determine an appropriate spreading path. These pseudo-levels are all the real levels in any hierarchy that are above the split level, combined with all combinations of any number, including no levels, of attribute dimensions where only one level per attribute dimension is used. Valid pseudo-levels in the hierarchies would include:

Class, Class/COO, Class/COO/PP, Class/PP, Department, Department/COO,

Department/COO/PP, Department/PP, and other combinations of attributes.

Figure 10:
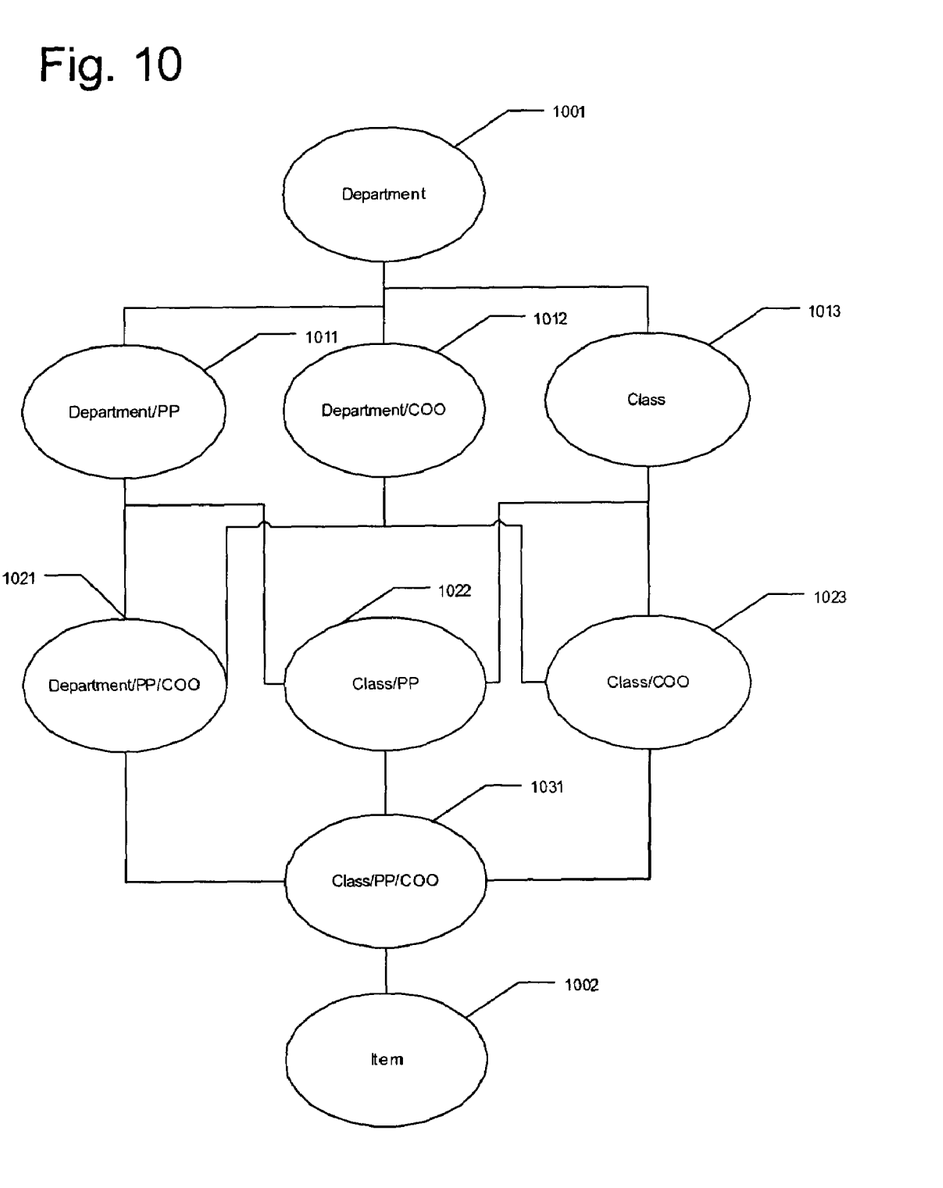
FIG. 10 illustrates a set pseudo-hierarchies of attributes within a retail sales analysis processing system according to an example embodiment of the present invention.

FIG. 10 illustrates a portion of a set of pseudo-hierarchies for a set of attributes according to an example embodiment of the present invention. In this example, the pseudo hierarchy starts at a department 1001 that may be split into three levels 1011–1013. These three levels include a Department/PP level attribute 1011, a Department/COO level attribute 1012 and a class attribute 1013. Each of these levels 1011–1013 may themselves be divided into three additional level attributes 1021–1023. These additional level attributes include a Department/PP/COO level attribute 1021, a Class/PP level attribute 1022, and a Class/COO level attribute 1023. These three level attributes may be combined into a single Class/PP/COO level attribute 1031 to complete the hierarchy above a level 1002 for each item. Alternate hierarchies from the Department 1001 to an item 1002 may be constructed using these and other attributes in different views of the data.

A pseudo-level that does not include a particular attribute dimension corresponds to the total in that attribute dimension. Thus Class/COO, for example, has members that represent all the members at the split level for a particular class and country of origin, without regard to the price point of the members at the split level.

To determine the pseudo-hierarchies and the parent-child relationship between pseudo-levels, the following rules should be followed:

1) Any pair of pseudo-levels where each pseudo-level includes at least one attribute dimension not in the other pseudo-level (for example, Class/COO and Department/PP, cannot be in the same pseudo-hierarchy).
2) Any pair of pseudo-levels where the real levels do not appear in the same real hierarchy cannot be in the same pseudo-hierarchy. This case cannot apply in our example, as we have just a single product hierarchy.
3) Any pair of pseudo levels where a pseudo-level with a higher real level has more attribute dimensions than a pseudo-level with a lower real level cannot be in the same pseudo-hierarchy. For example, Department/COO/PP level and Class/COO level cannot be in the same hierarchy.
4) Where multi-level attribute hierarchies are supported, if the first pseudo-level has a higher level in an attribute dimension, and the second pseudo-level is for a higher real level, or is for a higher level in a second attribute dimension, the two pseudo-levels cannot be in the same pseudo-hierarchy. Thus in a dimension splitting exercise that included the color attribute dimension (see example above), Department/detail color and Class/generic color cannot be in the same pseudo-hierarchy.
5) Any pair of pseudo-levels that passes the above tests can be in the same pseudo-hierarchy. The pseudo-level with fewer attribute dimensions is the parent (thus Class/COO is the parent of Class/COO/PP and Department/PP is the parent of Class/COO/PP). If both pseudo-levels have the same attribute dimensions, the pseudo-level with the higher real level is the parent (thus Department/COO is the parent of Class/COO).

For protection processing purposes, since the pseudo-levels that the user has changed are known, the rules can be used to determine which pseudo-levels, and thus which cells cannot be on the spreading pseudo-hierarchy, and must therefore be protected. For spreading purposes, the pseudo-levels with changes and the above rules can be used to determine the spreading pseudo-hierarchy. Once this pseudo-hierarchy has been determined, spreading can continue normally.

Note that there cannot be changes at or below that split level in a view that uses dimension splitting and cross attribute analysis. Therefore, if the split level is higher than the bottom level in the dimension, the lowest pseudo-level that is changed will be spread directly to the bottom level. However, if the view orientation supports the display of the split level (see FIG. 7), or the MDP application supports multiple views with different hierarchies, it is possible that there will have been changes made at the split level, or between the split level and the bottom level. In this case such changes will dictate the appropriate hierarchy to use between the lowest pseudo-level that is changed and the bottom level. The rules above may also be used to determine the aggregation paths so that all pseudo-levels may be correctly aggregated.

The dimension splitting described above may be considered to be the base form of dimension splitting, where a dimension that is split is split without any special regard to the other dimensions. That is, the relationships between the components of the split dimension do not vary by the other dimensions. The OLAP or MDP application can manage this type of split dimension with a single set of relationship that effectively replaces the original dimension.

A more complex form of Dimension Splitting is also required where the relationships between the components of the split dimension can vary depending upon the context. It must be assumed that a single ender-user session may require a set of data that encompasses more than one of these contexts. In essence, the requirement is that there be a separate set of relationships between the components of the split dimension for each different context. A couple of examples will explain the requirement.

Merchandise Planning systems for retailers typically support the development of certain types of product by location and by time plans through a process usually referred to as grading or clustering. The purpose of this process is to reduce the number of locations one has to deal with, so that stores are grouped into grades that represent a group of stores that are very similar. The exact definition of just how similar the stores must be varies considerably. Plans may then be built for each grade, usually by considering a typical store in the grade, and extending the values by the number of stores in the grade, to provide totals. In this process, each product, which typically may include a class or subclass at this stage of the process, has its own grading relationships, because the performance of stores will vary from product to product to reflect local differences in demand, stock holding capability, etc. Since the characteristics of the stores that are used to determine the grouping are what we have referred to as attributes, the grading process itself is an obvious end-user business case that will use dimension splitting.

The user of grade relationships will typically be working on a single product at a time, and thus the user will be clear what context they are operating within. In this circumstance, there is no ambiguity as to the relationships that should be used. However, for a variety of reasons, it is likely that the user will be working within a planning environment that includes multiple contexts: for example all the classes that the user is responsible for planning. Similarly, supply chain planning applications may support the sourcing of the same product from multiple locations (such as warehouses). In the simplest cases, the source to be used will be fixed. In more complex implementations, the source may vary across time.

In one possible example embodiment of context sensitive dimension splitting, a user control input mechanism enables a user to select a context for the data to be displayed. The user control input mechanism may be comprised of an input selection element of a user interface to the system such as a radio button, check box, and any other input selection user interface control to allow a user to specify the use and status of context sensitive dimension splitting. When the user control input mechanism is activated by a user selection the control input, the above described dimension splitting process is activated. As such, the set of members available for dimension splitting are presented to a user for use in defining a view to the data pertinent to the particular context being displayed. A user may utilize these input controls to select one of the members of a possible dimension for use in defining a particular context. A user may interactively define a desired context and have the appropriate view to the data displayed as discussed above.

FIG. 4 illustrates an example of a suitable operating environment in which the invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

A processing devices attached to a communications network 100 typically includes at least some form of computer readable media. Computer readable media can be any available media that can be accessed by these devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Additionally, the embodiments described herein are implemented as logical operations performed by a programmable processing devices. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe method, apparatus, and article of cross attribute analysis and manipulation in online analytical processing (OLAP) and multi-dimensional planning applications by dimension splitting in a retail sales environment, one skilled in the art will recognize that the use of a particular computing architecture for a display computing system and a central server are merely example embodiments of the present invention. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method, apparatus, and article of cross attribute analysis and manipulation in online analytical processing (OLAP) and multi-dimensional planning applications by dimension splitting in a retail sales environment.

What is claimed is:

1. A system, comprising;
   a hierarchy processing module for aggregating data up a hierarchical data structure;
   a dimension splitting module for creating pseudo-hierarchical data structures from data within the hierarchical data structure, the dimension splitting module providing cross attribute analysis and manipulation in online analytical processing and multi-dimensional planning applications, the dimension splitting module creating, for members of a single level of a dimension, one or more attribute dimensions based on values of attributes of several types, wherein the attributes are valid for the members of the single level of the dimension, and the single level and any lower levels of the single level are inactive, a dimension corresponding to an attribute of data contained within the hierarchical data structure; and
   a multi-dimensional data viewing module for displaying a set of multi-dimensional data according to the hierarchical data structure in a multi-dimensional spreadsheet,
   where dimension splitting includes one or more of, selectively re-arranging one or more data elements in hierarchical organization, selectively re-organizing one or more data elements in hierarchical organization, or selectively relocating one or more data elements in hierarchical organization.

2. The system according to claim 1, wherein the dimension splitting module splits a hierarchical set of attributes into a set of pseudo-hierarchical levels corresponding to combination of attributes present within the hierarchical data structure.

3. The system according to claim 1, wherein the hierarchy processing module performs aggregation, spreading and protection processing upon data values within levels of the hierarchical data structure.

4. The system according to claim 1, wherein the multi-dimensional data viewing module renders the multi-dimensional spreadsheet having a plurality of dimensions of data within columns of the multi-dimensional spreadsheet.

5. The system according to claim 4, wherein the multi-dimensional data viewing module renders the multi-dimensional spreadsheet having a plurality of dimensions of data within rows of the multi-dimensional spreadsheet.

6. The system according to claim 5, wherein a cell within the multi-dimensional spreadsheet corresponds to data having attributes of rows and columns of every dimension for the cell.

7. A method for providing cross attribute analysis and manipulation in online analytical processing and multi-dimensional planning applications by dimension splitting, the method comprising:
   generating a hierarchical organization having a plurality of dimensions of members, a dimension being all possible different types of related members and a member having attributes;
   defining a set of levels for a plurality of dimension of members, a level being a grouping of similar members and being organized into hierarchical parent-child relationships and the set of levels being defined by a set of activated members;
   creating, for members of a single level of a dimension, one or more attribute dimensions based on values of attributes of several types, wherein the attributes of several types are valid for the members of the single level of the dimension, and the single level and any lower levels of the single level are inactive;
   determining attribute values for each level in the hierarchical organization by sub-totaling the attribute values up the hierarchical organization; and
   presenting a visual display for the attribute values for each level in the hierarchical organization in a two-dimensional tabular format,
   where dimension splitting includes one or more of, selectively re-arranging one or more data elements in the hierarchical organization, selectively re-organizing one or more data elements in the hierarchical organization, or selectively relocating one or more data elements in the hierarchical organization.

8. The method according to claim 7, wherein the method further comprises:
   accepting input to a user control input mechanism to modify a set of members activated in hierarchical organization; and
   presenting a new visual display for attribute values using the hierarchical organization being defined by the modified set of activated members.

9. The method according to claim 8, wherein the levels of the hierarchical organization are displayed with parent-child relationships of attributes used to group attributes into rows and columns of the two-dimensional tabular format of data.

10. The method according to claim 8, wherein the user control input mechanism comprises an input selection element of a user interface to allow a user to specify a use and status of context sensitive dimension splitting.

11. A computer data product containing computer readable data and encoding instructions for implementing a method for providing cross attribute analysis and manipulation in online analytical processing and multi-dimensional planning applications by dimension splitting, the method comprising:
   generating a hierarchical organization having a plurality of dimensions of members, a dimension being all possible different types of related members and a member having attributes;
   defining a set of levels for a plurality of dimension of members, a level being a grouping of similar members and being organized into hierarchical parent-child relationships and the set of levels being defined by a set of activated members;
   creating, for members of a single level of a dimension, one or more attribute dimensions based on values of attributes of several types, wherein the attributes of several types are valid for the members of the single level of the dimension, and the single level and any lower levels of the single level are inactive;
   determining attribute values for each level in the hierarchical organization by sub-totaling the attribute values up the hierarchical organization;
   presenting a visual display for the attribute values for each level in the hierarchical organization in a two-dimensional tabular format;
   accepting input to a user control input mechanism to modify a set of members activated in hierarchical organization; and
   presenting a new visual display for attribute values using the hierarchical organization being defined by the modified set of activated members,
   where the computer data product comprises a computer readable storage medium for storing a set of computer readable data and encoded instructions,
   where dimension splitting includes one or more of, selectively re-arranging one or more data elements in the hierarchical organization, selectively re-organizing one or more data elements in the hierarchical organization, or selectively relocating one or more data elements in the hierarchical organization.

* * * * *

UNITED STATES PATENT AND TRADEMARK OFFICE
CERTIFICATE OF CORRECTION

PATENT NO. : 7,305,408 B2
APPLICATION NO. : 10/639551
DATED : December 4, 2007
INVENTOR(S) : Morris It is certified that error appears in the above-identified patent and that said Letters Patent is hereby corrected as shown below:

Column 1, line 62, delete "aggregation." and insert -- aggregation, --, therefor.

Column 8, line 13, delete "multidimentional" and insert -- multi-dimensional --, therefor.

Column 14, line 62, in Claim 2, delete "combination" and insert -- combinations --, therefor.

Column 15, line 21, in Claim 7, before "plurality" delete "a" and insert -- the --, therefor.

Column 15, line 21, in Claim 7, delete "dimension" and insert -- dimensions --, therefor.

Signed and Sealed this

Twenty-first Day of October, 2008

JON W. DUDAS
*Director of the United States Patent and Trademark Office*